United States Patent
Lewis, II

(10) Patent No.: US 6,264,713 B1
(45) Date of Patent: Jul. 24, 2001

(54) MEDIA FILTER ASSEMBLY HAVING REPLACEABLE FILTER ELEMENT

(75) Inventor: Earl K. Lewis, II, Williamstown, WV (US)

(73) Assignee: Skuttle Manufacturing Company, Marietta, OH (US)

( * ) Notice: Subject to any disclaimer, the term of this patent is extended or adjusted under 35 U.S.C. 154(b) by 0 days.

(21) Appl. No.: 09/453,337

(22) Filed: Dec. 2, 1999

(51) Int. Cl.$^7$ .................................................. B01D 35/30
(52) U.S. Cl. ................................ 55/481; 55/493; 55/502; 55/506
(58) Field of Search ........................... 55/478, 481, 493, 55/497, 502, 504, 506

(56) References Cited

U.S. PATENT DOCUMENTS

| | | | | |
|---|---|---|---|---|
| 3,494,113 | * | 2/1970 | Kinney | 55/481 |
| 4,701,196 | * | 10/1987 | Delany | 55/481 |
| 5,071,455 | * | 12/1991 | Abed-Asl | 55/509 |

OTHER PUBLICATIONS

Honeywell, Inc., "Honeywell Air Cleaners & Filtration Systems: Indoor Air Cleaning/Filtration F25 Media Air Cleaner and F35 Media Air Cleaner", 1998.

AirKontrol "Commercial & Industrial".

Trion, Inc., "Air Bear® Series Media Whole–House Air Cleaners" Form No. 02–0298, 1998.

LakeAir, "LakeAir In–Duct Models M–18 & M–22 Convertible models, Media 1–1814, Media 1–2214 and Dual-–Flow Replacement Media Filter".

* cited by examiner

Primary Examiner—David A. Simmons
Assistant Examiner—Robert A. Hopkins
(74) Attorney, Agent, or Firm—Renner, Kenner, Greive, Bobak, Taylor & Weber

(57) ABSTRACT

A filter assembly is provided having a housing and a cover that communicate to retain a filter element. The housing has a top and a bottom spaced apart from each other, and a first pair of guide members is maintained beneath the top while a second pair of guide members is maintained above the bottom. The filter element is retained in the housing between the first and second pair of guide members thereby defining a first cavity between the top and the filter element and a second cavity between the bottom and the filter element. Fasteners, such as screws, rivets, nails and the like, may communicate with the cavities without damaging the filter element. The first and second pair of guide members allow for access to the internal surface area of the top and bottom of the housing such that fasteners or other installment means can be employed from the inside of the housing outwardly to the duct work or framework to which the filter assembly is to be attached.

20 Claims, 7 Drawing Sheets

MEDIA FILTER ASSEMBLY HAVING REPLACEABLE FILTER ELEMENT

TECHNICAL FIELD

The present invention relates generally to air filter systems. More particularly, the present invention relates to a media filter assembly or cabinet having an improved design for simplifying installation and minimizing maintenance of the system.

BACKGROUND OF THE INVENTION

Central forced air systems are commonly used to heat and cool residential and commercial buildings. These systems force air from a central furnace or air conditioner through duct work that carries the air to various rooms or areas of the building. In order for these systems to work efficiently, it is important to minimize the transfer of air between the inside and outside of the building. One draw back of such weather tight building designs is that indoor air quality suffers. Airborne particles are trapped inside the building and accumulate such that the air in today's buildings may be anywhere from 20 to 100 times more polluted than the outdoor air. For obvious reasons, it is undesirable to have high concentrations of particulates, such as dust, pollen and smoke within a building. To combat this accumulation of airborne particulates, it is common practice to mount high efficiency air-filters in the return air duct of a forced air heating or cooling system.

The most commonly utilized filter element is the media filter. Media filters have extensive surface areas and typically comprise a series of folded pleats which capture airborne contaminates by surface loading. The media filter is retained within the return air duct by a filter assembly or cabinet that commonly includes a filter housing and a cover. The filter housing fixedly attaches to the return air duct in such a way that the return air drawn to the central heating or cooling system is forced to pass through the media filter retained within the filter assembly. As the returned air passes through the media filter, the airborne particulates are captured by the filter element so that the air drawn into the central system and dispersed throughout the building is substantially free of unwanted particulates. After an extended period of use, the accumulation of airborne particulates on the media filter begins to restrict air flow through the return air duct, making the central forced air system work harder and less efficiently. Therefore, filter elements must periodically be cleaned or replaced.

To facilitate the replacement of the filter element within the return air duct, filter assemblies preferably provide a means by which the media filter element retained with the filter housing may be replaced without requiring the removal of the filter housing from its fixed attachment within the return air duct. Typically, the filter assemblies include a removable cover that can be disengaged from the housing to enable the user to remove the filter element from the housing and replace it if necessary. The filter assembly is then returned to its operating condition by replacing and reattaching the cover.

Duct-mounted media filters may be installed in the return air duct in numerous ways, depending upon the location chosen for the media filter as well as the orientation of the return air duct in relation to the central forced air system. As those of ordinary skill in the art will readily appreciate, media filters can be installed as an in-line installation, closet installation, up-flow installation, side installation, or horizontal installation. However, many of the prior art media filter assemblies have been designed with a single orientation in mind, thereby requiring the use of a specifically designed media air-filter for the various types of installation orientations.

Despite the type of installation required and the filter assembly design employed, the most common means of installing the media filter housing involves fastening the filter housing at the appropriate location along the return air duct work using standard sheet-metal screws. Commonly, these screws secure the filter housing to the duct work by being screwed through the duct work and directly into the filter housing. It is very important that these screws do not come into contact with the media filter element within the housing because airborne particles will seek out the path of at least resistance through the filter media and, therefore, any puncture, tear, or hole in the media filter will compromise the filter's efficiency. Many prior art devices have attempted to address this installation concern by providing channels within the filter housing into which the screws may be safely inserted. These channels are created by designing the filter housing to be slightly wider than the filter element to be placed therein and providing the filter housing with guide members that center the filter element within the filter housing and offset it from the corners thereof at a distance sufficient to allow the insertion of installation screws.

These guide members are basically L-shaped members attached to the interior of the housing so as to create enclosed rectangular channels along the length of the interior edges of the housing. These channels provide an area into which screws may be inserted to install the housing in the return air duct without damaging the filter element held between the L-shaped members creating the channel. However, in these prior art devices, the size of the screw that may be used to install the housing is limited by the size of the channel, at least when the screw is being inserted into the channel towards the portion of the L-shaped guide member directly abutting the filter element. If the screw used to install the filter housing is longer than the width of the channel, the screw, when fully inserted, will exit the channel and puncture the filter element. Because the size of the channel adds to the width of the filter housing as a whole, in the interest of material cost, the size of the channel is minimized, and most prior art filter housings must be installed with screws around the order of about ½ inch in length.

These channels also limit the means by which the filter housing may be installed because they block off internal access to portions of the filter housing thereby requiring that the installment screws be attached to the housing from the outside in. For many installation orientations, it may be desirable to secure the filter housing to the duct and/or central forced air system by fastening the screws to the filter housing from the inside out. Additionally, these L-shaped guide members create two separate channels that run along the length of the housing at the corners thereof, allowing the filter element to directly abut the top and bottom walls of the filter cabinet. Therefore, the placement of installation screws is substantially limited in that screws can only be placed near the edges of the filter housing because placement outside this area, such as at the middle of the top or bottom wall, would cause the screw to puncture the filter element which directly abuts that area.

The prior art filter assembly designs may also be improved from a manufacturing and structural integrity standpoint. Particularly, the prior art L-shaped guide members which form the channels mentioned above are commonly known to be separate members that are welded, riveted or otherwise fastened at the appropriate edge areas of the filter housing. From a manufacturing standpoint, each extra member or structural item that makes up the filter assembly as a whole increases the complexity in assembling the finished product. Also, it should be realized that each individual structural item secured to create the finished filter assembly introduces an attachment means which may fail and thereby compromises the structural integrity of the filter assembly.

In most prior art filter assemblies, the means by which the filter element placed within the filter housing is accessed is simply a sheet-metal filter cover removably attached to a side of the filter housing. As such, the structural integrity of the filter cover is questionable, as is the seal that the filter cover creates between the filter cover and the filter element placed within the filter housing. If the seal between the cover and the filter element is inadequate, a substantial amount of air traveling through the return air duct may avoid passing through the filter element by following a path of least resistance around the filter element and flowing instead between the filter element and the filter cover.

Thus, there exists the need in the art for a filter assembly that allows the filter housing to be installed in the return air duct in a variety of orientations, wherein the screws utilized to install the filter housing may attach to the housing either from the outside in or from the inside out. Also, there is a need in the art for a filter assembly having less individual parts secured together to create the filter housing, such an improved design serving to decrease the complication of manufacturing the housing and increase its structural integrity. The need also exists for an improvement in the structural integrity of the filter cover and the seal which the filter cover creates between itself and the filter element placed within the filter housing.

SUMMARY OF INVENTION

In light of the foregoing, it is an aspect of the present invention to provide an improved filter assembly having a housing and cover.

It is another aspect of the present invention to provide a filter assembly that is capable of being installed in a return air duct in a variety of orientations.

It is still another aspect of the present invention to provide a filter assembly wherein installation screws can be attached to the filter assembly either from the inside or from the outside of the filter housing.

It is yet another object of the present invention to provide a filter assembly wherein the tendency for the filter element to become damaged through contact with the installation screws during installation is significantly reduced.

It is still another aspect of the present invention to provide a filter assembly that includes guide members for the installation of the filter element within the filter housing, wherein the guide members retain the filter element at a sufficient distance from the top and bottom of the filter housing so as to facilitate the safe attachment of installation screws to the filter housing.

It is still another aspect of the present invention to provide a filter assembly wherein the guide members are integral with the top and bottom portions of the filter housing so as to increase the ease of manufacture and the structural stability of the filter housing.

It is yet a further aspect of the present invention to provide a filter assembly having an improved filter cover design.

It is still a further aspect of the present invention to provide a filter assembly having an improved filter cover design, as above, wherein the filter cover exhibits substantial structural integrity and provides an improved seal between the filter cover and the filter element retained within the filter housing.

At least one or more of these and other aspects of the present invention, together with the advantages thereof over the known art relating to filter assemblies, which shall become apparent from the description which follows are accomplished by the improvements hereinafter described and claimed.

In general, the foregoing and other aspects of the present invention are obtained by a filter assembly comprising a housing having a top and bottom spaced apart from each other, a first pair of guide members maintained within the housing beneath the top, a second pair of guide members maintained within the housing above the bottom, a filter element retained in the housing, and a cover for maintaining the filter element within the housing. The filter element is maintained between the first and second pair of guide members to define a first cavity between the top and the filter element and a second cavity between the bottom and the filter element.

A preferred exemplary filter assembly incorporating the concepts of the presents invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
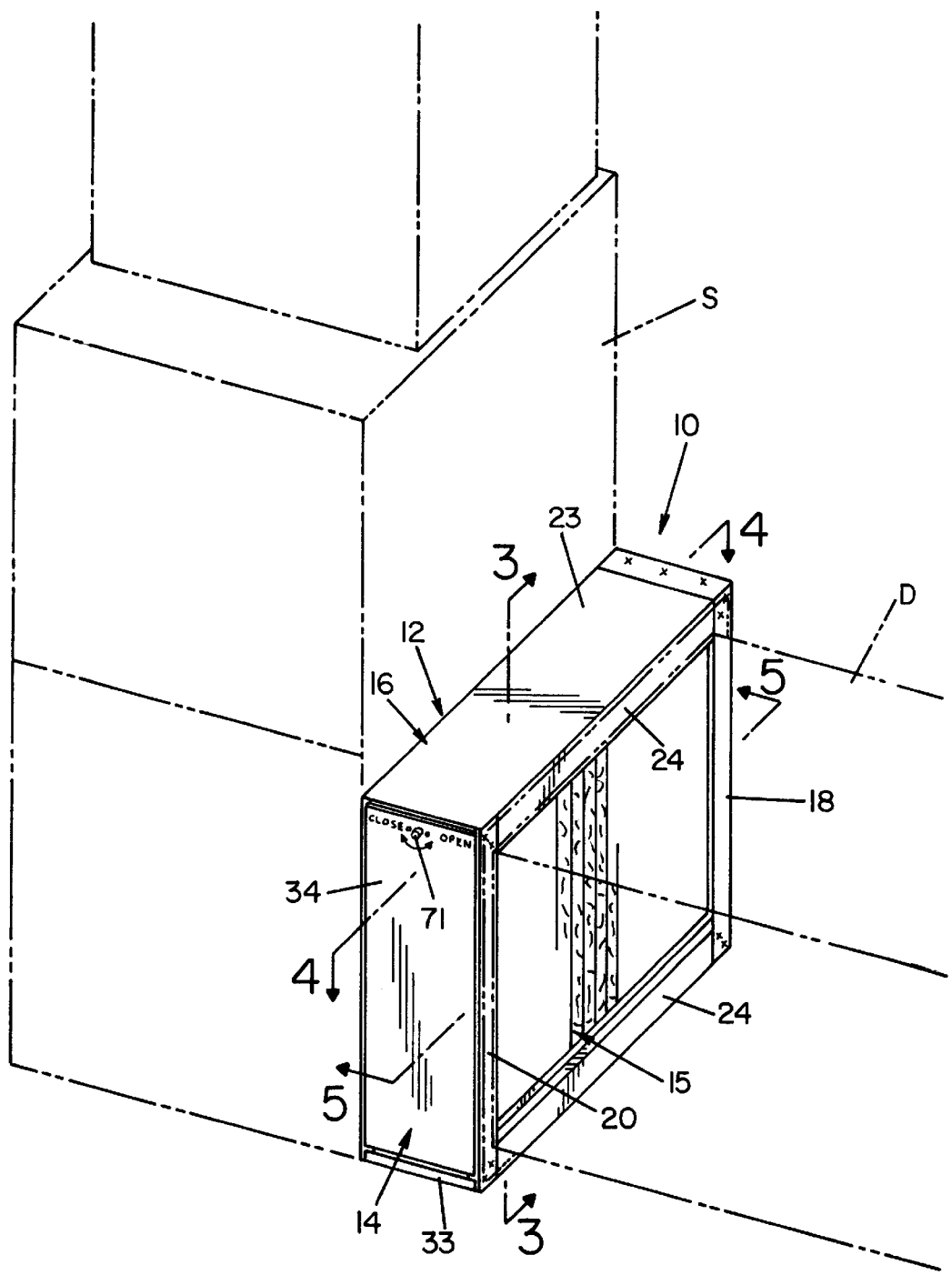
FIG. 1 is a perspective view showing the filter assembly or cabinet of the present invention installed within a return air duct and abutting a central forced air system.
Figure 2:
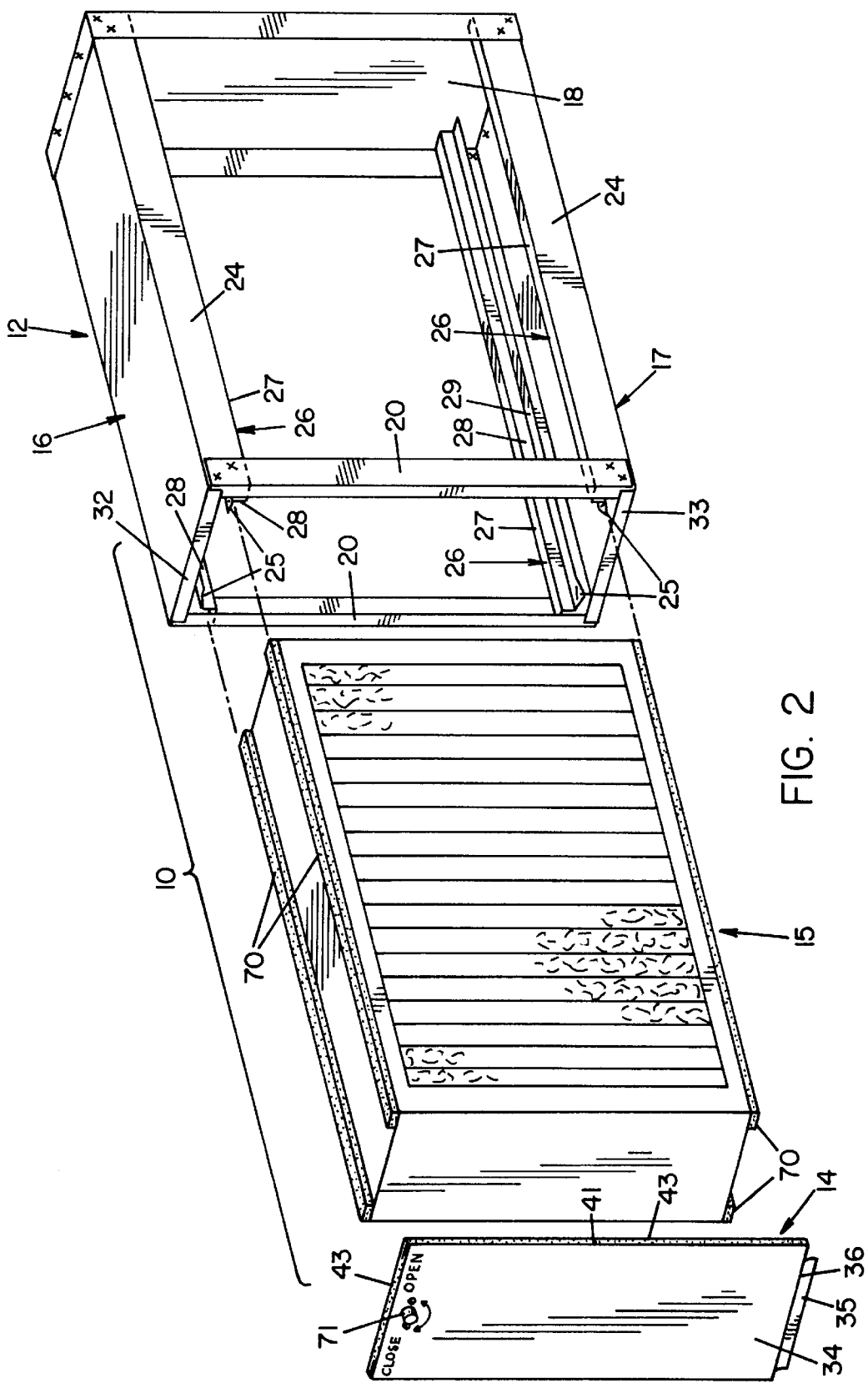
FIG. 2 is an exploded view of the filter assembly of the present invention depicting the installation of a filter element within the filter housing and being enclosed by the filter cover.

As noted hereinabove, the present invention is directed toward the construction of an air filter assembly for use preferably in a return air duct of a forced air system. One representative embodiment of a filter assembly according to the concepts of the presents invention is designated generally by the numeral 10 in FIGS. 1 and 2. With particular reference to FIG. 2, it can be seen that filter assembly 10 includes a filter housing 12 and a filter cover 14 that serve to retain filter element 15 within the filter housing 12. Filter element 15 is retained across the pathway of air traveling in the direction shown by the arrows in FIGS. 3 and 4 through a return air duct D towards a central forced air system S. As those skilled in the art will appreciate, the orientation of filter assembly 10 in FIG. 1 represents just one of various positions that filter assembly 10 may occupy in a return air duct. Regardless of the type of installation practiced, filter housing 12 is securely fastened to return air duct work D by screws or other like fasteners and allows for the replacement of filter element 15 when a substantial buildup of airborne particulates has collected thereon. Replacement of a spent filter element 15 is accomplished simply by removing filter cover 14 from filter housing 12 and removing the spent filter element 15. The spent filter element is replaced it with a new filter element, and the filter cover 14 is subsequently repositioned back to its original position engaging housing 12.

Figure 8:
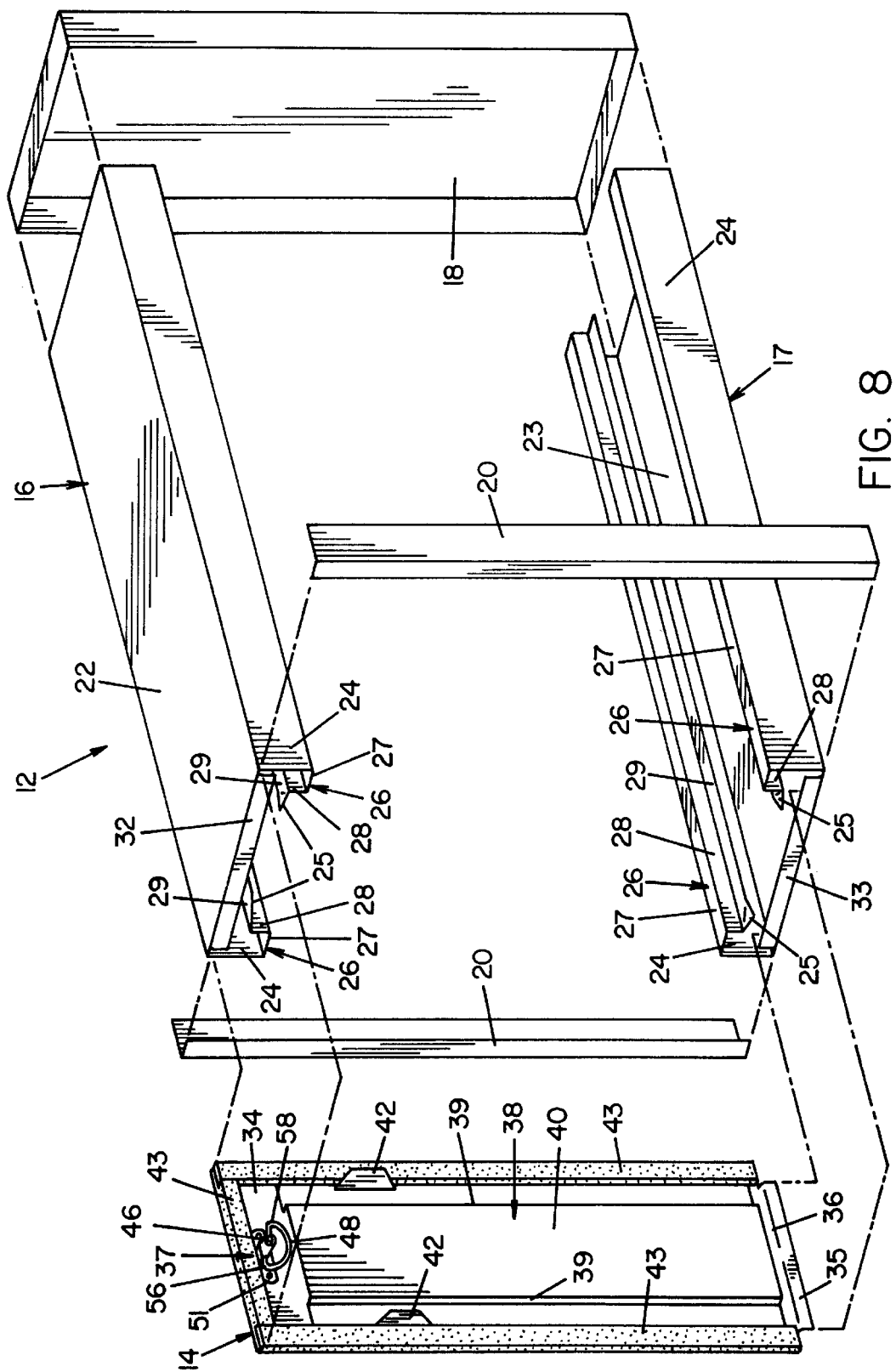
FIG. 8 is an exploded view of the assembled parts of the filter housing and filter cover of the present invention.

Referring now to FIGS. 2 and 8, it can be seen that filter housing 12 is formed from a top installment member 16, a bottom installment member 17, an end plate 18, and a pair of opposed angled support members 20. These individual elements, when fitted together as shown in FIG. 8, form the filter housing 12 of filter assembly 10, as shown in FIG. 2, and thereby provide a frame for the retention of filter element 15 and the acceptance of filter cover 14. It should be understood that the designation herein of installment members 16, 17 as "top" and "bottom" installment members is made merely to facilitate the disclosure of the present invention with reference to the drawings. Indeed, the filter assembly 10 may be utilized in a variety of orientations wherein installment members 16 and 17 may or may not occupy positions that could be readily designated as "top" or "bottom" positions, and, additionally, it is one aspect of the present invention that filter assembly 10 has no specific set orientation in which it must operate. Similarly, the designation immediately hereinbelow concerning top plate 22 and bottom plate 23 also serve merely to aid in the present description and the filter assembly of the present invention and should not be limited by any restrictive interpretation of such terms.

Top installment member 16 provides a top plate 22 and bottom installment member 17 provides a bottom plate 23 for housing 12, respectively. Top plate 22 and bottom plate 23 each have a pair of opposed guide flanges 24 extending along their length at opposite sides thereof. Extending inwardly from along the length of guide flanges 24 are guide members 26. As more particularly shown in FIG. 3, each guide member 26 on top installment member 16 includes a first run portion 27 extending interiorly of housing 12 and substantially parallel to top plate 22 along the length of guide flange 24; a rise portion 28 extending along the length of first run portion 27 and perpendicular thereto towards top plate 22 and preferably substantially parallel to guide flange 24; and a second run portion 29 extending interiorly of housing 12 along the length of rise portion 28 and substantially parallel to top plate 22 and/or first run portion 27. Similarly, each guide member 26 on bottom installment member 17 includes a first run portion 27 extending interiorly of housing 12 and substantially parallel to bottom plate 23 along the length of guide flange 24; a rise portion 28 extending along the length of first run portion 27 and perpendicular thereto towards bottom plate 23 and preferably substantially parallel to guide flange 24; and a second run portion 29 extending interiorly of housing 12 along the length of rise portion 28 and substantially parallel to bottom plate 23 and/or first run portion 27.

As shown in FIGS. 2 and 8, a preferred embodiment of the filter assembly provides that the inwardly directed corners 25 proximate the filter cover 14 of the second run portions 29 may be bent or otherwise formed in a manner to provide easier installation of the filter element 15 into the filter housing 12. To that end, it will be appreciated that filter element 15 may be inserted into housing 12 by aligning the edges of filter element 15 with the step-shaped guide members 26 in the housing 12 and sliding the filter element 15 into position. In a preferred embodiment, the edges of filter element 15 may include foam pads 70 or other sealing means which effectively creates an air tight seal between the filter element 15 and the guide members 26 and prevents air flow around the filter element 15.

Figure 3:
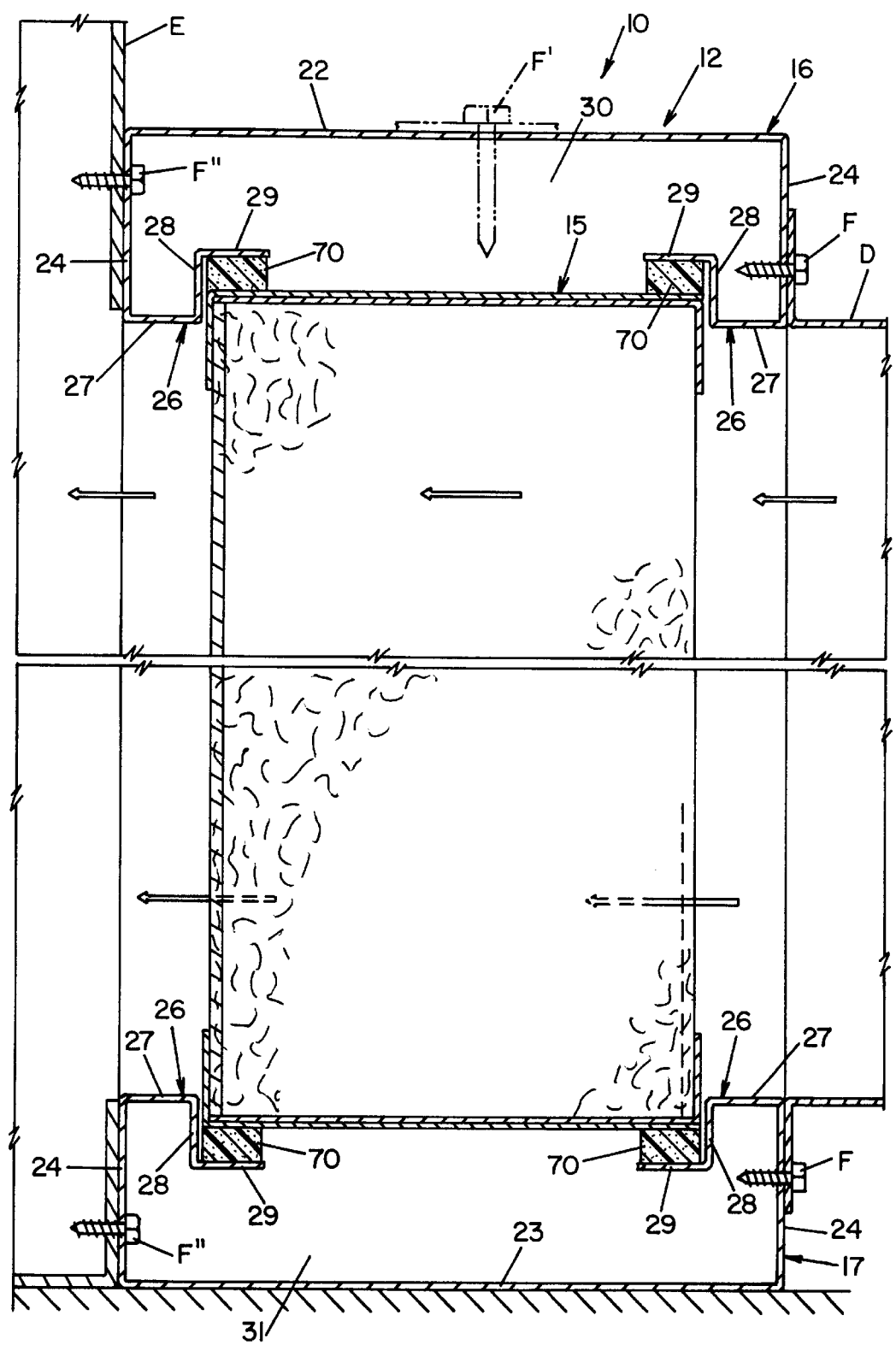
FIG. 3 is a cross-sectional view of the filter assembly taken along the line 3—3 represented in FIG. 1.

As best shown in FIGS. 2 and 3, the step-like shaped guide members 26 serve to define a retention area for filter element 15 at a position remote from top and bottom plates 22 and 23, as well as from guide flanges 24 so as to provide improved installment aspects over those appreciated in the prior art. Specifically, the installment members 16 and 17, by providing guide flanges 24 and guide members 26 as described hereinabove, serve to provide a filter housing 12 that, together with the filter element 15, defines a first cavity 30 between top plate 22 and filter element 15 and a second cavity 31 between bottom plate 23 and filter element 15, respectively. Cavities 30 and 31 provide improved installation aspects in that the filter assembly 10 may be secured to return air duct work D and other air control framework E by fasteners such as, for example, screws F, in a manner that will not damage filter element 15 retained in the filter housing 12. It should be readily apparent that the mounting of filter assembly 10 to duct work or other framework is not limited to the use of screws, and cavities 30, 31 protect filter element 15 from various installation means such as screws, nails, rivets, and other fasteners commonly known in the art.

As more particularly shown in FIG. 3, sheet metal screws F similar to those presently used in installing prior art air filter assemblies may continue to be used in the same manner as in the prior art. To that end, the screw F may be fastened to guide flange 24 in an area that screw F should be small enough not to penetrate further then rise portion 28. However, screw F may alternatively be fastened to guide flange 24 in an area above (for top installment member 16) or below (for bottom installment member 17) the edge of rise portion 28 such that the length of screw F is of no consequence. The screw F may also be fastened to any other part of the housing 12, including the guide members 26 themselves.

In addition, guide members 26, as shown, allow for access to the interior surfaces of top plate 22 and bottom plate 23 as well as guide flanges 24 such that fasteners may be attached from within the filter housing 12. While it will be appreciated that guide members 26 could be constructed such that second run portions 29 of top and bottom installment members 16 and 17 connect and prevent access into cavities 30, 31, it is preferred that such access be provided.

The fastening screws marked F, F' and F" in FIG. 3 evidence the advantageous aspects concerning installation of the present invention. Screws F and F' will not harm filter element 15 in as much as filter element 15 is retained at a position remote from the exposed ends of screws F and F'. Of course, the length of screws F and F' also contribute to the safety of their installation. It should be noted, however, that the prior art does not allow for the placement of a screw in the position of screw F' in as much as prior art filter assemblies employ L-shaped guide members that only offset the filter element from the edges of the housing, not the top or bottom.

Fastening screw F" evidences how a screw may be installed from within the interior of filter assembly 10, thereby eliminating any chance of contact between the filter element 15 and the exposed end of such a fastening screw. Generally, it will be understood that in order to install a fastening screw F", the filter element 15 will not be positioned within the filter housing 12. Only after installation of the housing 12 should the filter element be positioned into the retention area of the filter housing 12.

The filter housing 12 and cover 14 are preferably created from aluminum, galvanized steel, or other commonly known metal used in the production of filter assemblies, although the present invention is not necessarily limited thereto or thereby. The preferable dimensions for the filter assembly 10 will depend upon the central forced air system, and more particularly upon the duct work, to which the filter assembly 10 is to be installed. The selection of materials and dimensions will be readily ascertainable for any given system by those of ordinary skill in the art without undue experimentation and is essentially a matter of design choice.

As shown in the preferred embodiment, the installment members 16 and 17 are preferably of unitary construction, guide members 26 being integral with respective guide flanges 24 and top plate 22 or bottom plate 23. It should be readily apparent that such a construction increases the ease of manufacture and the structural stability of filter assembly 10, eliminating the need for welding, riveting, or otherwise fastening guide members 26 as separate structural items.

Figure 4:
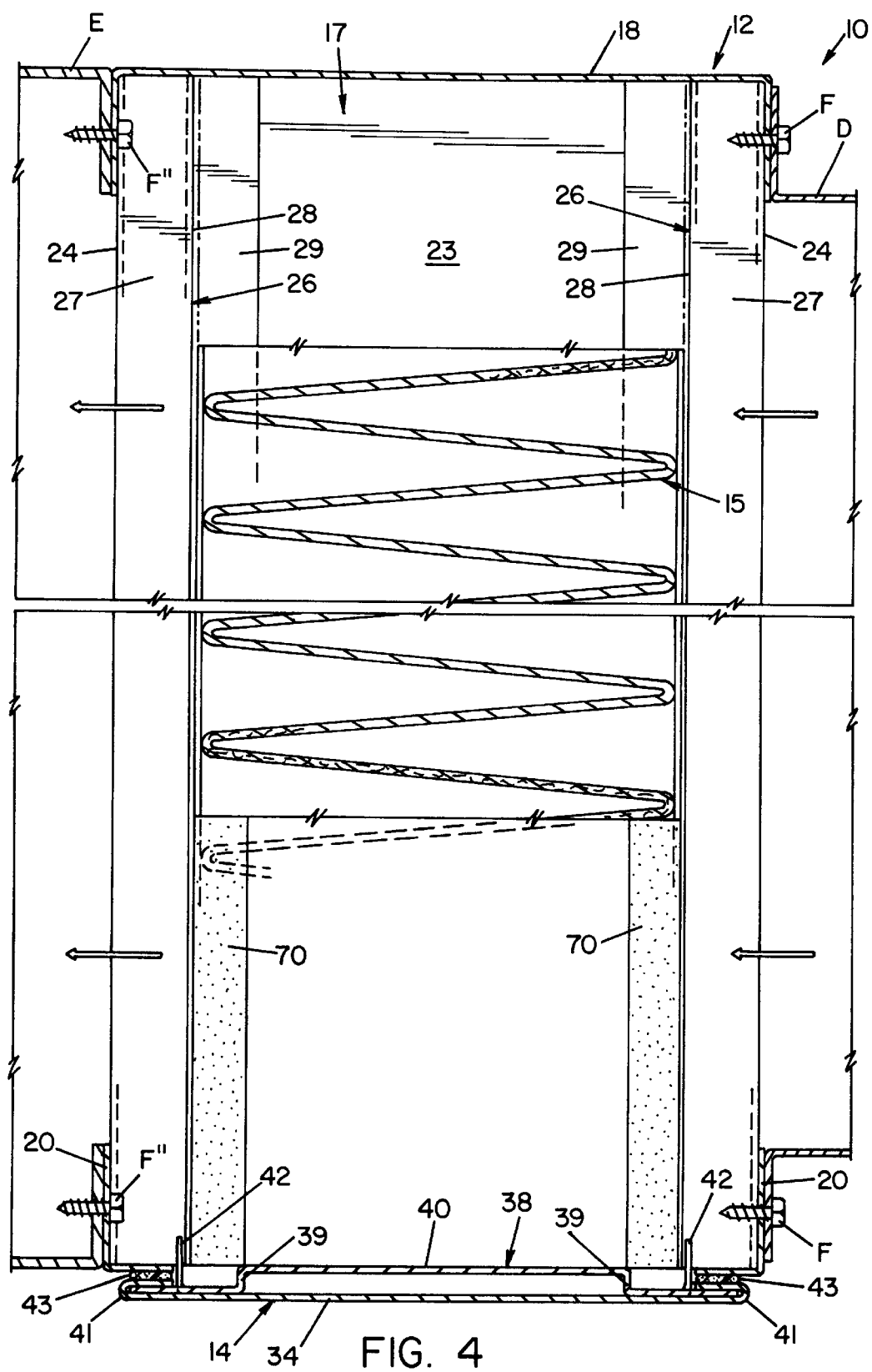
FIG. 4 is a cross-sectional view of the filter assembly taken along the line 4—4 represented in FIG. 1.
Figure 5:
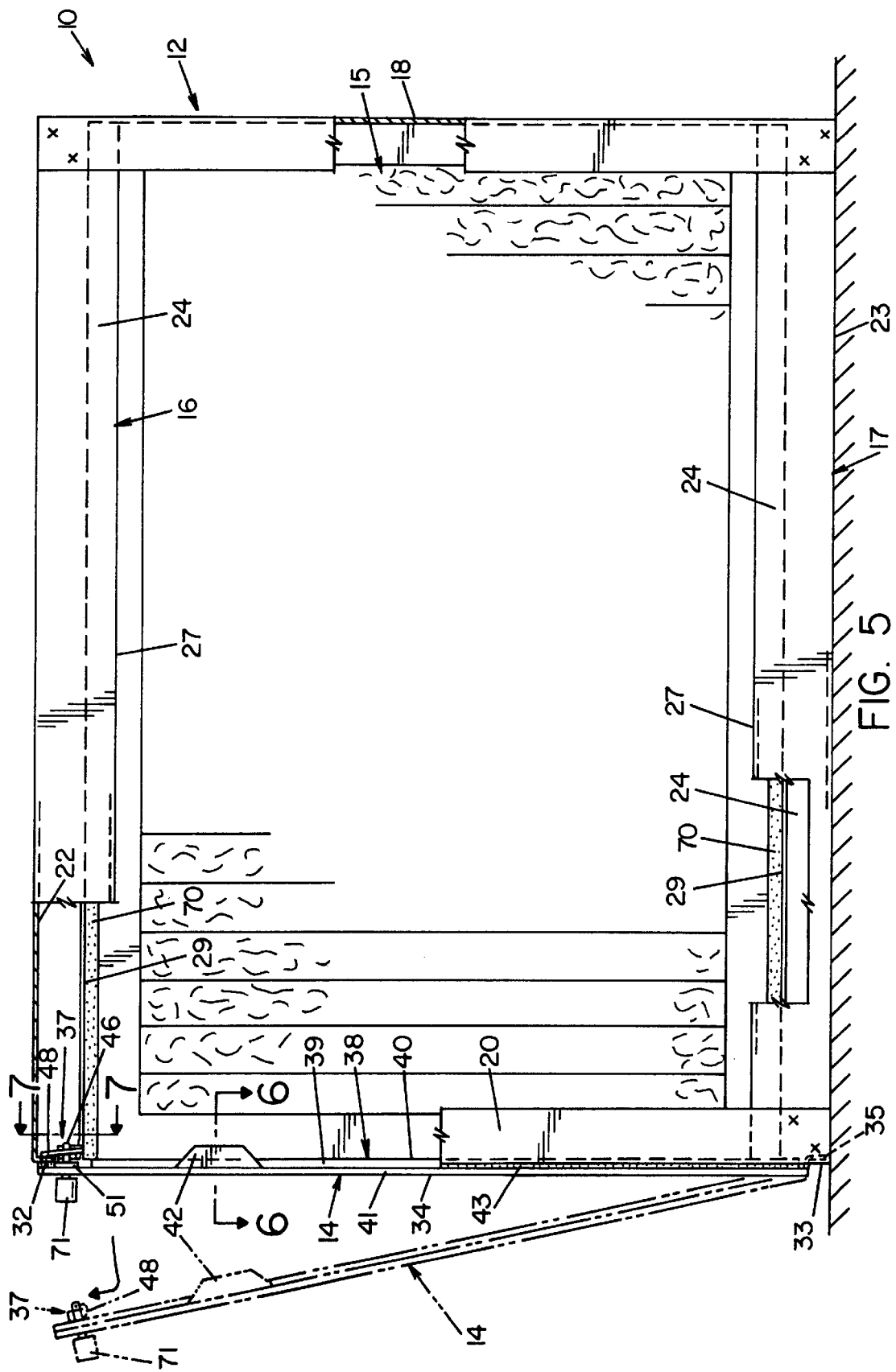
FIG. 5 is a cross-sectional view of the filter assembly taken along the line 5—5 represented in FIG. 1, with the cover being shown partially open in phantom.
Figure 6:
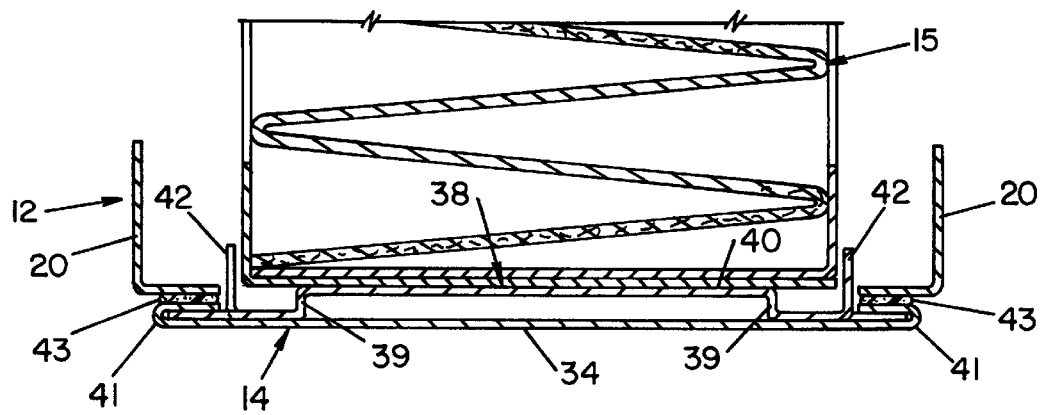
FIG. 6 is a cross-sectional view of the filter assembly taken along the line 6—6 represented in FIG. 5 and depicting the seal created between the filter cover and filter element retained within the filter assembly.

Referring now to FIGS. 4 and 5, it can be seen that filter element 15, placed within housing 12, abuts end plate 18 and is bordered opposite end plate 18 by cover 14. As described hereinbelow, cover 14 provides improved sealing aspects to the present invention and also has improved structural integrity.

With reference to FIGS. 2, 4–6 and 8, it can be seen that installment members 16, 17 provide a cover mounting flange 32, 33 at their respective ends approximate to angled support members 20. As shown in FIG. 2, support members 20 preferably attached to installment members 16, 17 between mounting flange 32, 33, respectively, and guide members 26. As will become more apparent from the description which follows, this relationship between support members 20 and installment members 16 aids in the improved sealing aspect mentioned above with respect to cover 14 and its function in the filter cabinet 10 of the present invention. In FIGS. 2 and 8, the pair of mounting flanges 32 and 33 are distinguished herein by their designation as top mounting flange 32 and bottom mounting flange 33 in order to facilitate discussion as to how cover 14 attaches to filter housing 12, however, it should be understood that mounting flanges 32 and 33 are, in the preferred embodiment of the present invention, identical and differ only in their respective orientations.

Filter cover 14 includes a flat plate 34 sized to seal off the open end of housing 12 of filter assembly 10 utilized to insert the filter element 15. A cover flange 35, offset by bend 36 extends from one end of plate 33 and is preferably integral there with, plate 3,4, cover flange 35 and bend 36 being formed of one continuous piece of material. At the other end of plate 34 opposite cover flange 35, a latch mechanism generally denoted as 37 is positioned. When securing cover 14 to housing 12, cover flange 35 communicates with bottom mounting flange 33 and latch mechanism 37 communicates with top mounting flange 32 to releasably secure the cover 14 to the housing 12. However, it should be understood that this orientation of cover 14 can be reversed such that cover flange 35 communicates with top mounting flange 32 and latching mechanism 37 communicates with bottom mounting flange 33, it being an aspect of the present invention that cover 14 is operatively reversible in orientation.

As shown in phantom in FIG. 5, cover 14 may be mounted on filter housing 12 by placing cover flange 35 behind bottom mounting flange 33 and pivoting cover 14 to a closed position. Upon reaching the closed position, latch mechanism 37 may be manipulated so as to fasten cover 14 by turning knob 71 or otherwise manipulating latch 48 to extend behind mounting flange 32.

A reinforcement plate 38 is attached to the inside face of plate 34 and extends over at least a portion thereof. Referring to the cross-sectional views of FIGS. 4 and 6, the reinforcement plate 38 is preferably hat-shaped having at least a pair of bends 39 in it to provide at least some surface 40 for abutting the filter element 15 and holding the filter element in place. Thus, the surface 40 which contacts the filter element 15 is preferably not the cover plate 34 itself, but rather a portion of the reinforcement plate 38 which recedes into the retention cavity of the housing 12 holding the filter element 15. The reinforcement plate 38 is preferably formed as an integral two-piece construction with plate 34 as shown as at 41 in FIG. 4, but is not necessarily limited thereto. That is, reinforcement plate 38 could be separately welded or otherwise securedly attached to the plate 34, more made of integral one-piece construction if so desired. Integral construction allows for a reduction in the number of parts and in the associated manufacturing cost.

In addition, cover 14 also preferably includes a pair of cover guides 42 extending inwardly toward the filter element 15 that serve to properly align the cover 14 in relation to filter element 15 placed within housing 12. When properly aligned, guides 42 will position themselves between angled support members 20 and the front and back side of filter element 15, thereby further stabilizing and securing the filter element 15 in its appropriate position. This, in combination with the surface 40 of reinforcement member 38 pressing against the side panel of the filter element 15 when cover 14 is fastened to housing 12, wedges the element 15 between reinforcement plate 38 and end plate 18. This has the affect of increasing the seal between those outer portions of filter element 15 and the abutting portions of filter assembly 10, thereby decreasing the tendency for particulate-laden return air to avoid passing through filter element 15 and instead pass between filter element 15 and end plate 18 or cover 14.

Cover 14 may also be provided with gaskets 43 positioned preferably substantially around the periphery of cover 14 except, as can be seen clearly in FIG. 8, in the area of cover flange 35. When cover 14 is mounted on housing 12, gaskets 43 contact angled support members 20 and top mounting flange 32 to effectively seal the cover shut, thereby preventing any particulate-laden air that may force its way around filter element 15 from exiting filter assembly 10 at the interface between cover 14 and housing 12. If any air is drawn into the filter, it will be filtered by the gaskets 43 provided on cover 14. The effectiveness of the sealing aspects just disclosed is increased by characteristics of the latch mechanism 37 of the preferred embodiment.

Figure 7:
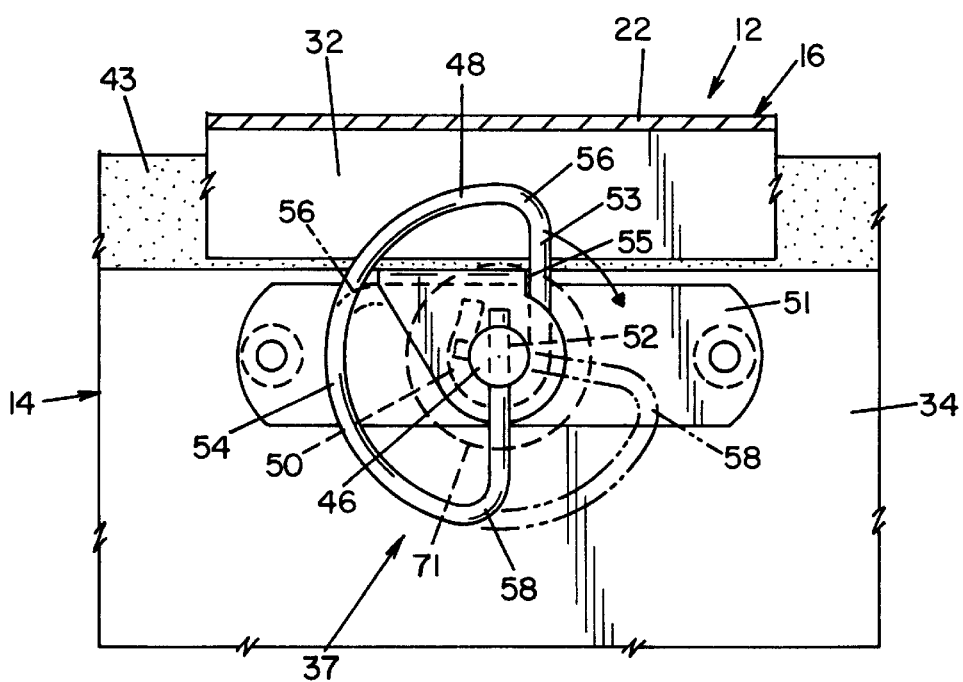
FIG. 7 is a cross-sectional view taken along the lines 7—7 represented in FIG. 5 and depicting the latching mechanism of the filter cover shown in the closed position and in phantom in the open position.

With reference to FIGS. 5 and 7, latch mechanism 37 has a turning knob 71, provided on the outside face of cover 14, that directly communicates with a pin 46 extending through cover 14. The tightening latch 48 is attached to pin 46 such that manipulating pin 46 by means of knob 71 causes tightening latch 48 to be manipulated as well. Tightening latch 48 connects twice to pin 46, once at the base of pin 46 near plate 34 and once near the top of pin 46 remote from the first connection point. Tightening latch 48 connects at the base of pin 46 by hook 50 and connects to the top of pin 46 by insertion through aperture 52. Between these two connection points, tightening latch 48 forms an essentially half circle 54 defined by bends 56 and 58. Because the connection at aperture 52 lies above the connection point at hook 50, half circle 54 slopes upward from bend 56 to bend 58. Bend 56 is therefore maintained in a position very nearly abutting plate 34.

When closing the cover 14, it is positioned onto housing 12 as set forth hereinabove and knob 71 is turned. Upon manipulation of knob 71 (in the embodiment shown, this is done by turning the knob in the clockwise direction), bend 58 of latch 48 passes behind top mounting flange 32. The seal between cover 14 and housing 12 increases because tightening latch 48 contacts top mounting flange 32 at some point along half circle 54 such that, as tightening latch 48 continues to be turned to the closed position. Plate 34 and gaskets 43 on cover 14 are pulled into very intimate and forceful contact with housing 12 until, as shown in FIG. 7, the latch mechanism 37 is in a position where bend 56 is directly behind and in contact with the mounting flange 32.

To aid in the precision of stopping the turning procedure, a stop mechanism 51 is constructed and attached to interior side of cover plate 34 such that latch portion 53 contacts edge 55 of stop mechanism 51 to prevent the knob 71 from turning any further. Once the knob 71 is stopped by stop mechanism 51, the knob 71 is in its fully closed position and the cover 14 should be sealingly engaged to the housing. In this position, the seal between cover 14 and housing 12 is under its greatest pressure because, as mentioned above, the bend 56 is positioned very near plate 34.

To open the latch mechanism, the knob 71 is simply turned in the other (counterclockwise) direction. This loosens the cover 14 from the housing 12 by moving bend 56 away from top mounting flange 32. In fact, the latch 48 turns will turn in the direction of the arrow shown in FIG. 7 such that, with about a three-quarter turn, the entire latch 48 will be positioned below the lowest edge of the top mounting flange 32. Hence, the cover 14 can then be removed by first pulling the top of the cover 14 away from the housing 12 as shown in FIG. 5, and then removing the cover flange 35 at the bottom of the filter assembly 10 from the bottom mounting flange 33 on housing 12.

Thus, it should be evident that the filter assembly of the present invention will effectively filter particulate-laden air using a much more convenient filter housing. The invention is particularly suited for use in a return air duct of an air filter system, but is not necessarily limited thereto, it being understood that the air filter assembly could be used anywhere throughout the system. The filter assembly can also be used in any of a variety of orientations, wherein the screws utilized to install the filter housing may attach to the housing either from the outside in or from the inside out.

Based upon the foregoing, it should now be apparent that a filter assembly constructed as described herein according to the concepts of the present invention, accomplishes the objects of the invention and otherwise substantially improves the art. It is, therefore, to be understood that any variations evident fall within the scope of the claimed invention and thus, selection of specific component elements can be determined without departing from the spirit of the invention herein disclosed and claimed. In particular, the present invention should not necessarily be limited to the type of fasteners employed in the preferred embodiment of this disclosure. Furthermore, other means for latching or otherwise closing the cover of the filter assembly to the housing can be employed without necessarily departing from the spirit of the present invention. Thus, while the preferred embodiment of the invention has been presented and described in, detail, the invention is not necessarily limited thereto or thereby. Accordingly, for appreciation of the true scope and breadth of the invention, reference should be made to the following claims, noting that the invention shall include all modifications and variations that may fall within the scope of the attached claims.

What is claimed is:

1. A filter assembly comprising:
    a housing having a top and bottom spaced apart from each other;
    a first pair of guide members maintained within said housing beneath said top and integral with said top of said housing such that said top and said first pair of guide members are of unitary construction;
    a second pair of guide members maintained within said housing above said bottom and integral with said bottom of said housing such that said bottom and said second pair of guide members are of unitary construction;
    a filter element retained within said housing between said first and second pairs of guide members; and
    a cover maintaining said filter element within said housing, wherein said filter element and said first pair of guide members define a first cavity between said top and said filter element and wherein said filter element and said second pair of guide members define a second cavity between said bottom and said filter element.

2. A filter assembly according to claim 1 wherein said first pair of guide members allow access to an internal surface of said top of said housing when said filter element is not retained within said housing.

3. A filter assembly according to claim 2 wherein said second pair of guide members allow access to an internal surface of said bottom of said housing when said filter element is not retained within said housing.

4. A filter assembly according to claim 1 wherein said first and second pairs of guide members allow access to said first and second cavities, respectively, such that at least one fastener is employed from within each of said first and second cavities outwardly to areas external of said housing.

5. A filter assembly according to claim 1 further comprising an end plate, wherein said filter element is retained between said first and second pair of guide members and between said end plate and said cover.

6. A filter assembly according to claim 1, wherein said cover comprises:
    a plate;
        a cover flange extending from said plate;
        a hat-shaped reinforcement member attached to said plate, wherein said hat-shaped reinforcement member wedges said filter element between said cover and an end plate of said housing, thereby increasing the seal between said filter element and said housing.

7. A filter assembly according to claim 1, further comprising:
    a top mounting flange extending downwardly from said top;
    a bottom mounting flange extending upwardly from said bottom, wherein the orientation of said cover is reversible such that, in a first orientation, said cover flange communicates with said top mounting flange to retain said filter element, and, in a second orientation, said cover flange communicates with said bottom mounting flange to retain said filter element.

8. A filter assembly according to claim 7 wherein said cover further comprises gaskets to seal said cover to said housing.

9. A filter assembly according to claim 8 wherein said cover further comprises cover guides to align said cover with said housing.

10. A filter assembly according to claim 1, further comprising a latch maintained on said cover wherein said latch attaches said cover to said housing from within said filter assembly.

11. A filter assembly according to claim 10, wherein said latch includes a knob extending to the outside of said cover and wherein said latch releasably engages said housing upon manipulation of said knob.

12. A filter assembly according to claim 1, further comprising a first pair of guide flanges extending along the length of said top of said housing at opposite sides thereof, said first pair of guide members extending from said first pair of guide flanges in unitary construction; and
a second pair of guide flanges extending along the length of said bottom of said housing at opposite sides thereof, said second pair of guide members extending from said second pair of guide flanges in unitary construction.

13. A filter assembly comprising:
a housing having a top and bottom spaced apart from each other;
a first pair of guide members maintained within said housing beneath said top;
a second pair of guide members maintained within said housing above said bottom;
a filter element retained within said housing between said first and second pairs of guide members;
a cover maintaining said filter element within said housing, wherein said filter element and said first pair of guide members define a first cavity between said top and said filter element and wherein said filter element and said second pair of guide members define a second cavity between said bottom and said filter element; and
at least one fastener inserted through said housing and into said first cavity without damaging said filter element.

14. A filter assembly according to claim 13 wherein at least one fastener is inserted through said housing and into said second cavity without damaging said filter element.

15. A filter assembly comprising:
a housing having a top and bottom spaced apart from each other;
a first pair of guide members maintained within said housing beneath said top;
a second pair of guide members maintained within said housing above said bottom;
a filter element retained within said housing between said first and second pairs of guide members;
a cover maintaining said filter element within said housing, wherein said filter element and said first pair of guide members define a first cavity between said top and said filter element and wherein said filter element and said second pair of guide members define a second cavity between said bottom and said filter element; and
a first pair of guide flanges extending from said top to said first pair of guide members.

16. A filter assembly according to claim 15, further comprising a second pair of guide flanges extending from said bottom to said second pair of guide members.

17. A filter assembly according to claim 15, wherein said first pair of guide members comprise:
a first run portion extending along the length of said first pair of guide flanges toward the interior of said housing and substantially parallel to said top;
a rise portion extending toward said top along the length of said first run portion and being substantially perpendicular to said first run portion and said top; and
a second run portion extending along the length of said rise portion toward the interior of said housing and substantially parallel to said first run portion and said top.

18. A filter assembly according to claim 16, wherein said second pair of guide members comprise:
a first run portion extending along the length of said second pair of guide flanges toward the interior of said housing and substantially parallel to said bottom;
a rise portion extending toward said bottom along the length of said first run portion and being substantially perpendicular to said first run portion and said bottom; and
a second run portion extending along the length of said rise portion toward the interior of said housing and substantially parallel to said first run portion and said bottom.

19. A filter assembly according to claim 16 wherein said first pair of guide members are integral with said first pair of guide flanges and said top, and said second pair of guide members are integral with said second pair of guide flanges and said bottom.

20. A filter assembly comprising;
a housing having a top installment member and a bottom installment member spaced apart from each other, said top installment member having a top plate, a top pair of guide flanges extending from said top plate, and a top pair of guide members extending from said top pair of guide flanges, and said bottom installment member having a bottom plate, a bottom pair of guide flanges extending from said bottom plate, and a bottom pair of guide members extending from said flange;
a filter element retained within said housing between said top and bottom installment members on said top and bottom of pair of guide members; and
a cover maintaining said filter element within said housing, wherein said filter element and said top installment member provide a single top cavity defined by said filter element, said top plate, said top pair of guide flanges, and said top pair of guide members, and said filter element and said bottom installment member provide a single bottom cavity defined between said filter element, said bottom plate, said bottom pair of guide flanges, and said bottom pair of guide members.

* * * * *